(12) United States Patent
Stephan et al.

(10) Patent No.: US 6,764,095 B2
(45) Date of Patent: Jul. 20, 2004

(54) METHOD FOR CONTROLLING AIRBAG DEPLOYMENT

(75) Inventors: Craig Hammann Stephan, Ann Arbor, MI (US); Mark Anthony Cuddihy, New Boston, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 10/177,442

(22) Filed: Jun. 21, 2002

(65) Prior Publication Data

US 2002/0171234 A1 Nov. 21, 2002

Related U.S. Application Data

(63) Continuation-in-part of application No. 09/697,852, filed on Oct. 27, 2000, now abandoned.

(51) Int. Cl.[7] .......................... B60R 21/01; B60R 21/32
(52) U.S. Cl. ...................... 280/735; 180/273; 340/667; 701/45
(58) Field of Search .......................... 280/735; 180/273, 180/268; 340/667, 668; 701/45

(56) References Cited

U.S. PATENT DOCUMENTS

| | | |
|---|---|---|
| 5,865,463 A | 2/1999 | Gagnon et al. |
| 5,996,421 A | 12/1999 | Husby |
| 6,209,915 B1 | 4/2001 | Blakesley |
| 6,259,042 B1 | 7/2001 | David |
| 6,260,879 B1 | 7/2001 | Stanley |
| 6,264,236 B1 | 7/2001 | Aoki |
| 2002/0043789 A1 * | 4/2002 | Lichtinger et al. .......... 280/735 |

FOREIGN PATENT DOCUMENTS

| | | |
|---|---|---|
| DE | 100 50 551 A1 | 6/2001 |
| WO | WO 01/18507 A1 | 3/2001 |
| WO | WO 02/26531 A2 | 4/2002 |
| WO | WO 02/026531 A3 | 4/2002 |

* cited by examiner

Primary Examiner—Peter C. English
(74) Attorney, Agent, or Firm—Gary Smith

(57) ABSTRACT

A method of deploying a passenger side airbag as a function of the actual mass of the occupant on the passenger seat. This is accomplished by providing force sensors at one or more of the anchor pieces at which a seat belt is connected to the vehicle. The sensors may be strain gauges that measure the deflection of bolts connecting the ends of the seat belt to the anchor pieces. By sizing the nominal resistance of strain gauges at two anchor pieces, the two resistors can be put in a series circuit such that only the sum of the two resistances need be measured. The measurements obtained are then used to obtain the vertical components of force due to the seat belt. This value is then be subtracted from the total vertical force measured by a seat cushion weight sensor to determine the mass of the seat occupant.

15 Claims, 5 Drawing Sheets

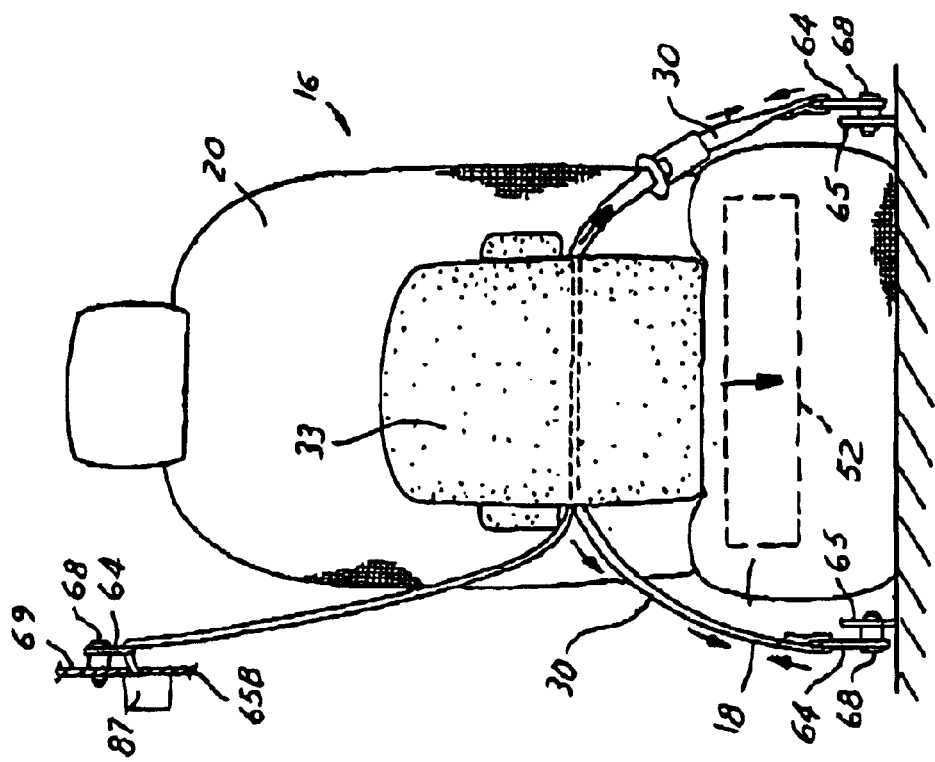
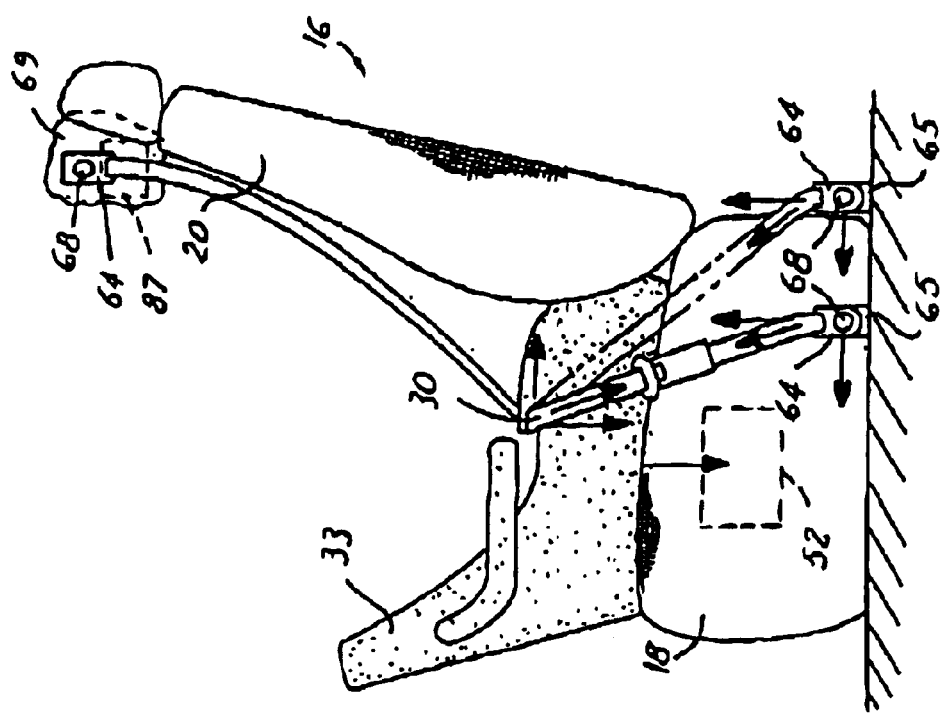

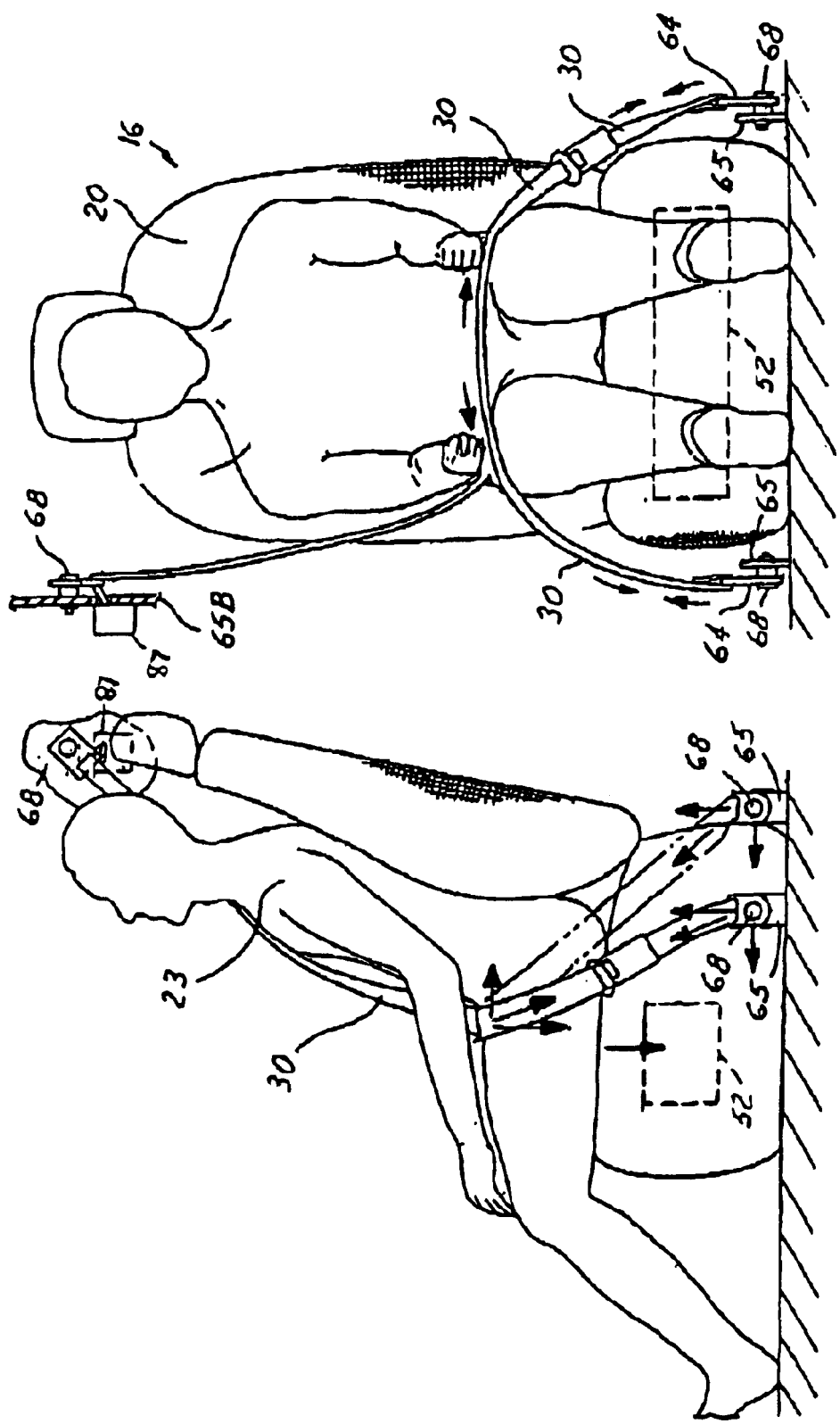

METHOD FOR CONTROLLING AIRBAG DEPLOYMENT

RELATED APPLICATION

This is a Continuation-In-Part of U.S. patent application Ser. No. 09/697,852, filed on Oct. 27, 2000, abandoned.

TECHNICAL FIELD

The present invention relates generally to restraint systems and more particularly to a method for controlling airbag deployment in automobiles.

BACKGROUND

It is well known to provide occupant restraint assemblies for vehicles, such as passenger cars, to restrain the occupant during a crash. Typically, an occupant restraint assembly includes a seat belt, an airbag and an inflator for inflating the airbag. When a crash occurs, as sensed by a crash sensor, the airbag is deployed by inflating it with gas.

In order to control the firing of an airbag in a collision, it is important to know the mass of the seat occupant. Weight sensors, such as bladders and pressure pads disposed in or under the seat, are available for measuring the vertical force of the occupant on the seat cushion. However, the seat belt can add an unknown quantity to this vertical force. For an adult occupant, this force is likely to be small, since a tightly cinched seat belt would be uncomfortable. However, for a child in a car seat this force can be large, since the seat belt is cinched around the seat, not the child, and the belt should be deliberately drawn tight to secure the car seat.

Devices are available that measure tension in the seat belt webbing. However, these devices suffer from several drawbacks. Reliable, unobtrusive electrical connections must be made to them through the belt webbing. In measuring tension, these devices do not sense the desired parameter, which is the vertical component of tension. The seat belt may wrap around the occupant through a range of angles, depending upon seat fore-aft location, size of occupant and whether the occupant is in a car seat. As such, a reliable estimate of the vertical component of force may not be attainable by these devices. In addition, the seat belt may have frictional or clamp forces on it if it feeds through child seat attachment slots, so that the tension of the belt changes with location.

It is thus highly desirable to provide a simple, reliable means of determining the vertical component of total force applied by the seat belt, so that it may be subtracted from the total vertical force measured by a seat cushion weight sensor.

SUMMARY OF THE INVENTION

It is thus an object of the present invention to provide a simple, reliable method for determining the vertical component of total force applied by the seat belt, which is then used to properly control the firing of an airbag during a collision.

This object is accomplished by providing force sensors at two, or if necessary, all three of the attachment pieces of the standard three-point lap belt. These sensors (strain gauges) measure the resistance at these attachment points. By sizing the nominal resistance of the two floor attachment bolt strain gauges, the two resistors can be put in a series circuit such that only the sum of the two resistances need be measured. The measurements obtained are then used to obtain the vertical components of force due to the seat belt. This value may then be subtracted from the total vertical force measured by a weight sensor in the seat cushion to determine the mass of the vehicle seat occupant.

Other objects and advantages of the present invention will become apparent upon considering the following detailed description and appended claims, and upon reference to the accompanying drawings.

BRIEF DESCRIPTION OF THE DRAWINGS

FIG. 2 is a schematic side view illustrating a vehicle front passenger seat and sensor assembly with a child seat mounted on the seat, wherein the force contributions of the seat belt on the sensor assembly is illustrated;

FIG. 2A is a rearward looking view of FIG. 2 showing the force contributions of the seat belt on the sensors;

FIG. 3 is a schematic sideward looking view of the front passenger seat and sensor assembly showing the force contributions of the seat belt on the sensors;

FIG. 3A is a rearward looking view of FIG. 3 showing the force contributions of the seat belt on the sensors;

DESCRIPTION OF THE PREFERRED EMBODIMENT(S)

Figure 1:
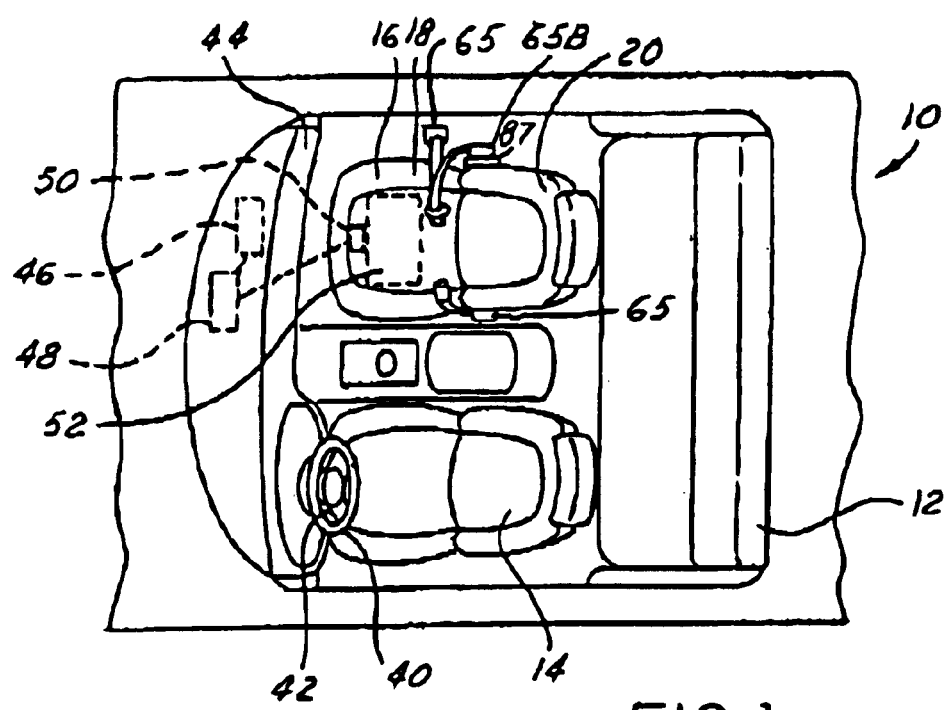
FIG. 1 is a schematic view looking down into a vehicle illustrating a portion of the seating and sensor assembly in accordance with the present invention.

Referring now to FIGS. 1–3 a typical vehicle 10 having a back seat 12, a front driver seat 14 and a front passenger seat 16. Although shown as separate herein, the front driver seat 14 and front passenger seat 16 can also be formed as a single bench seat. The passenger seat 16 includes a seat pardon 18 and a back portion 20 extending up from the seat portion 18.

The vehicle 10 also includes front airbag assemblies. Mounted within a steering wheel 40 is a driver's side front airbag assembly 42, and mounted within an instrument panel 44 is a passenger side front airbag assembly 46. The two front airbag assemblies 42, 46 are electrically connected to an electronic airbag control module 48, which controls the deployment system in typical fashion known to those skilled in the art and so not discussed further herein. Also electronically connected to the airbag control module 48 is a seat weight module 50. The seat weight module 50 can be housed separately, as shown, or can be formed as part of the airbag control module 48. Both of these modules 48, 50 can be software or hardware based, or a combination of the two. A seat weight sensor 52, such as a bladder or a pressure pad, is mounted within the seat portion 18 of the passenger seat 16 and is electrically connected to the seat weight module 50.

Referring now to FIGS. 2 and 2A, the passenger seat 16 is shown with a child seat 33 secured in place. In order to control the firing of the air bag, it is important to know the mass of the passenger seat occupant. As a child seat 33 is secured to the passenger seat 16 by fastening the three-point safety belt 30, a series of forces, depicted by arrows, are experienced within portions of the belt 30, back portion 20, and seat portion 18. As seen in FIG. 2, the three-point safety belt is mounted within vehicle 10 using anchor pieces 65, 65B. The upper anchor piece 65B may be mounted to the B-pillar 69 directly and may support a B-pillar mounted ring. The vertical component of these forces, along with the weight of the child seat 33 containing the child, are measured by a seat weight sensor 52 contained within the passenger seat 16. The vertical component of these forces must then be subtracted from the weight of the occupant as measured by the seat weight sensor 52 to determine the actual weight, hence mass, of the occupant.

Similarly, for a passenger 23 contained within the passenger seat 16, as depicted in FIGS. 3 and 3A, a series of forces are experienced within portions of the belt 30, back portion 20, and seat portion 18. The vertical component of these forces, along with the weight of the passenger, is measured by a seat weight sensor 52 contained within the passenger seat 16. The vertical component of the seat belt forces must be subtracted from the weight of the passenger 23 as measured by the seat weight sensor 52 to determine the actual mass of the passenger 23.

The present inventive means for determining the vertical component of force modifies the bolts used to attach the seat belt 30 to the vehicle 10 at two or three points. These points typically consist, as shown in FIGS. 1–3A, of an anchor piece 65 of one end of the seat belt 30 to the vehicle 10, an anchor piece 65 of the seat belt 30 tongue to either the seat or the floor, and an upper anchor piece 65B, where the belt 30 typically passes through a "B" pillar mounted ring on its path to the seat belt retractor mechanism 87. The vertical component of force can then be measured at these points and subtracted from the total force as measured by the seat weight sensor 52.

Figure 4:
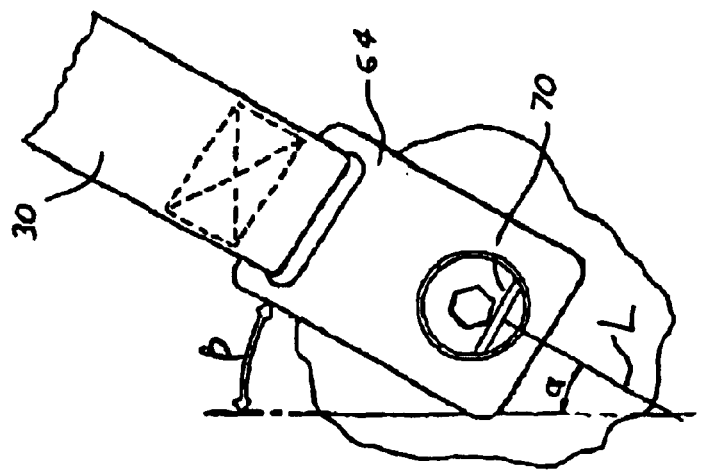
FIG. 4 is a side view of a seat belt attachment piece containing a seat belt tension measuring system according to a preferred embodiment of the present invention.
Figure 5:
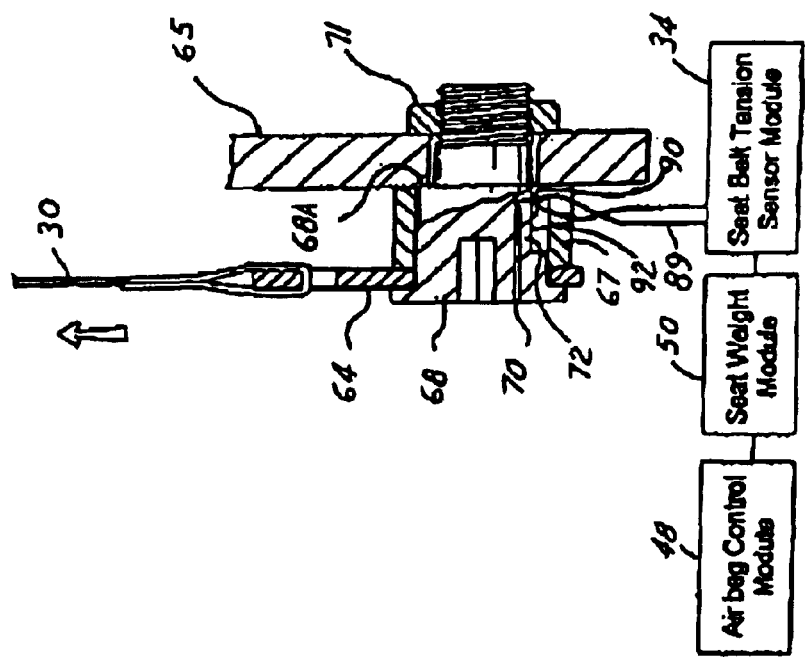
FIG. 5 is a cross-sectional and side view of FIG. 4.

FIGS. 4 and 5 depict a seat belt mounting structure as used at either anchor piece 65 or the anchor piece 65B. The seat belt 30 is connected to a swivel plate 64. Each swivel plate 64 is held to the anchor piece 65, 65B of the vehicle 10 by a mounting bolt 68 and a nut 71. The anchor piece 65, as shown in FIG. 5, may be a piece of the vehicle's structure, such as the floor, or a portion of the seat 14, 16. While not shown in FIG. 5, the upper anchor piece 65B may also be a piece of the B-pillar 69 of the vehicle. This is shown in FIGS. 2A and 3A. The swivel plate 64 is allowed to rotate around the mounting bolt 68, and is prevented from interfering with the vehicle anchor piece 65, 65B and surrounding components by both a shoulder 68A on the bolt 68 and a spacer 67. The mounting bolt 68 has a tangential flat 92 formed on one side thereof, and an off-center slit 70 extends inwardly from the head of the bolt and is parallel with the flat 92. The lower portion 72 of the bolt 68 formed by the slit 70 defines a cantilever that is relatively flexible in a direction normal to the plane of the slit 70. When the bolt 68 is secured to the anchor piece 65, 65B, the normal to the slit 70 (indicated by line L in FIG. 4) and the flat 92 forms an angle α (see FIG. 4) with the vertical.

In an alternative arrangement, the anchor piece 65, 65B may be threaded and a crushable washer (not shown) inserted between the anchor piece 65, 65B and the shoulder 68A of the bolt, which allows the bolt 68 to be tightened to a prespecified torque at the prescribed angle α. Many other possible configurations will be apparent to a person of skill in the art.

As best seen in FIG. 5, for a preferred embodiment having two anchor pieces 65, a strain gauge 90 is attached to the flat 92 on the bottom of the bolt 68. The strain gauge 90 has a pair of wires 89 that are coupled to a seat belt tension sensor module 34. The normal to the slit 70 and flat 92 is oriented with respect to vertical by some angle α which can be chosen to lie anywhere between 0 and a nominal angle β that the seat belt 30 makes with the vertical. During normal operation, the cantilever is bent slightly by the seat belt tension t, the effect of which is manifested in a change of resistance of the strain gauge 90 proportional to the strain on the bolt 68. This resistance change is converted by module 34 to a voltage, thus giving an estimate of the force exerted on the seat belt 30 at that anchor piece 65.

Assuming the cantilever is vertically oriented (where α is 0), the force exerted by the belt 30 on the cantilever section of the bolt 68 bends the cantilever slightly, thus stretching the strain gauge 90. However, since the cantilever bends only in the vertical direction, only the vertical component of the seat belt tension, $F_v = t \cos(\beta)$ is measured, as desired. In operation, $F_v$ is calculated from the strain λ measured by strain gauge 90 as ($F_v = k\epsilon$), where k is the effective spring constant of the cantilever (force per Unit strain).

More generally, the cantilever may be oriented at some angle α other than vertical. This might be desirable in order to reduce the component of force along the stiff axis of the cantilever to ensure that it is not forced in this direction, and/or to ensure that the swivel plate 64 is always in contact with the cantilever even at its furthest orientation from vertical. In such a case, the vertical component of force when the seat belt 30 is oriented along its nominal angle β is related to measured strain by ($F_v = k^1 \epsilon$), where $k^1 = [k(\cos(\beta))/(\cos(\beta - \alpha))]$ is the effective spring constant.

Figure 6A:
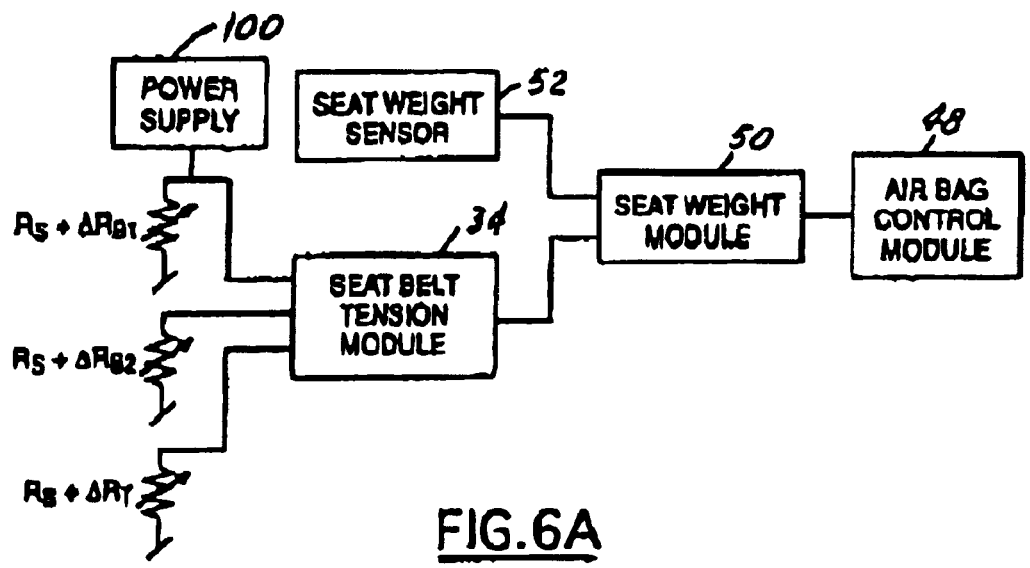
FIG. 6A is a signal-processing diagram of the modules of FIG. 5.

The change in resistance of the strain gauges 90 is algebraically summed by module 34 and an output (i.e. load signal) sent to sensor module 50 reflecting the net downward force produced by the seat belt 30 on the mass-sensing seat weight sensor 52, or bladder as shown in FIG. 6A. The seat weight module 50 processes the load signal to determine the vertical component of force and then subtracts the vertical force component from the weight as measured by the seat weight sensor 52 to accurately determine the mass of the occupant in the passenger seat 16. A signal is then sent from the seat weight module 50 to the airbag control module 48 regarding this mass. This signal is then processed by the airbag control module 48 to control the deployment system of the passenger side, front airbag assembly 46 in crash situations as a function of the vehicle mass and vehicle speed in typical fashion known to those skilled in the art.

In practice, the upward force exerted by the upper seat belt anchor piece 65B is likely to be small compared to the downward forces exerted by the two lower anchor pieces 65, and a strain gauge 90 may not be needed on the upper anchor piece 65B. However, in the following description, all three strain gauges 90 will be assumed. The change in resistance of each strain gauge 90 is proportional to the vertical component of force on its respective anchor piece 65, 65B. If all three strain gauges 90 have the same unstrained resistance $R_S$ and the same strain sensitivity, then the net downward force is proportional to the algebraic sum of the resistance deviations, $\Delta R_{B1} + \Delta R_{B2} - \Delta R_T$, where the symbols refer to the change of resistance of the strain gauge 90 at the two lower anchor pieces 65 and the upper anchor piece 65B respectively.

Figure 6B:
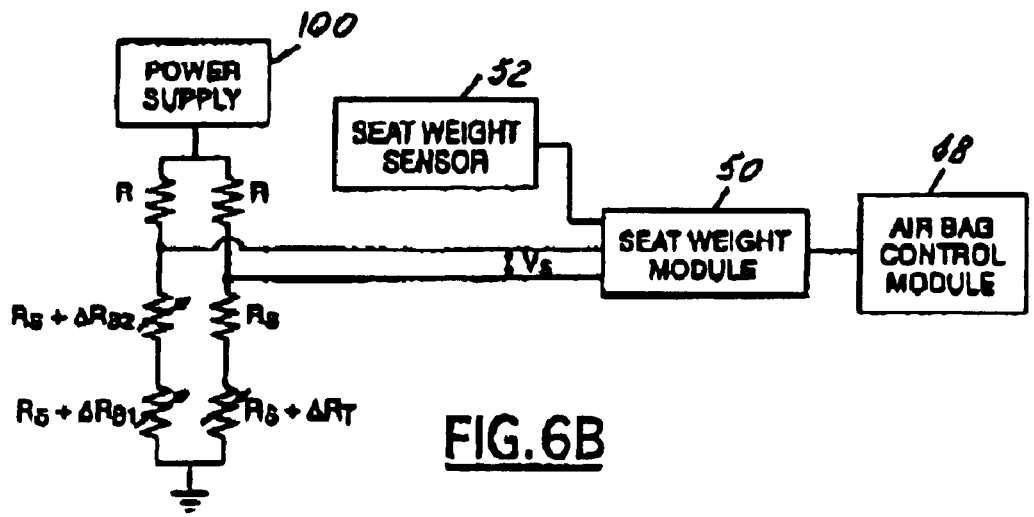
FIG. 6B illustrates a signal-processing diagram for the seat belt tension module of FIG. 5.

A preferred embodiment for the seat belt tension sensor module 34 is shown in FIG. 6B. It consists of a power supply 100, here a voltage source, producing a voltage V across a Wheatstone bridge circuit consisting of two equal-value fixed resistors R in the upper arms, the two lower seat belt anchor strain gauge resistances $R_S+\Delta R_{B1}$ and $R_S+\Delta R_{B2}$ in the lower left arm, and the upper anchor point strain gauge resistance $R_S+\Delta R_T$ plus a fixed resistance $R_S$ in the lower right arm. It is readily shown that when the changes in resistance $\Delta R$ of the strain gauges 90 are small compared to their nominal values R, the output voltage of the bridge is:

$$V_S = \frac{1}{(2R_S+R)^2}(\Delta R_{B1}+\Delta R_{B2}-\Delta R_T)V$$

That is, the output voltage is directly proportional to the algebraic sum of the forces. The seat weight module 50 multiplies $V_S$ by the appropriate proportionality constant to obtain the net force of the seat belt 30 on the occupant and subtracts this from the force indicated by the seat weight sensor 52 to determine the weight, and hence mass, of the occupant.

Figure 6C:
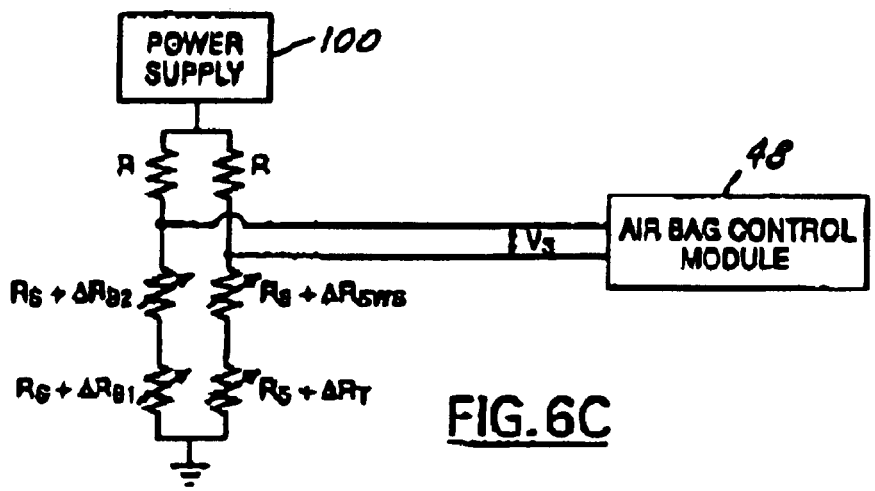
FIG. 6C illustrates an alternative signal-processing diagram of FIG. 5, wherein the seat weight sensor is also a strain gauge.

If the seat weight sensor 52 was also a strain gauge with the same sensitivity as the strain gauges 90, it could be included in the Wheatstone bridge circuit, replacing the constant resistance $R_6$. This is shown in FIG. 6C. The output of the Wheatstone bridge circuit would be:

$$V_S \alpha (\Delta R_{B1}+\Delta R_{B2}-\Delta R_T-\Delta R_{SWS})$$

where $\Delta R_{SWS}$ is the resistance change in the seat weight sensor. In this case, the output voltage $V_S$ would be directly proportional to the mass of the occupant, and the module 50 could be eliminated.

While the invention has been described in terms of preferred embodiments, it will be understood, of course, that the invention is not limited thereto since modifications may be made by those skilled in the art, particularly in light of the foregoing teachings.

What is claimed is:

1. A method for measuring the actual mass of a seat occupant secured to a seat of a vehicle by a seat belt, the method comprising the steps of:

measuring a total downward force on a seat contributed by a seat occupant and seat belt tension;

providing a first strain gauge mounted on a first attachment bolt used to couple the seat belt to a first anchor piece;

providing a second strain gauge mounted on a second attachment bolt used to couple the seat belt to a second anchor piece;

measuring a change in resistance of said first strain gauge, wherein said change of resistance of said first strain gauge is a result of the bending of said first attachment bolt in response to the degree of tension in the seat belt at a location near said first anchor piece;

sending a first signal from said first strain gauge to a seat belt tension sensor module proportional to a change in resistance of said first strain gauge;

measuring a chance in resistance of said second strain gauge, wherein said change of resistance is a result of the bending of said second attachment bolt in response to the degree of tension in the seat belt at a location near said second anchor piece;

sending a second signal from said second strain gauge to said seat belt tension sensor module proportional to a change in resistance of said second strain gauge;

converting said first signal and said second signal to a load signal within said seat belt tension sensor module, said load signal proportional to an algebraic sum of said first signal and said second signal; and sending the load signal to a seat weight module, wherein the seat weight module determines a vertical component of force contributed by seat belt tension as a function of the load signal;

measuring a vertical component of force contributed by seat belt tension; and subtracting the vertical component of force from the total downward force to determine a weight, and hence the actual mass, of the seat occupant.

2. The method of claim 1, wherein the step of measuring a total downward force on a seat contributed by a seat occupant and seat belt tension comprises the step of:

receiving a seat weight sensor signal from a seat weight sensor regarding the total downward force of the seat occupant and seat belt tension.

3. The method of claim 1, wherein said first attachment bolt rotatably couples the seat belt to said first anchor piece.

4. A method for measuring the actual mass of a seat occupant secured to a seat of a vehicle by a seat belt, the method comprising the steps of:

measuring a total downward force on a seat contributed by a seat occupant and seat belt tension;

providing a first strain gauge mounted on a first attachment bolt used to couple the seat belt to a first anchor piece;

providing a second strain gauge mounted on a second attachment bolt used to couple the seat belt to a second anchor piece;

coupling said first strain gauge and said second strain gauge within a respective arm of a Wheatstone bridge contained within a sensor module;

deriving an output voltage proportional to the algebraic sum of the change in resistance to said first strain gauge and said second strain gauge, said change in resistance corresponding to an amount of vertical force exerted by the seat belt on said first strain gauge and said second strain gauge, said output voltage corresponding to a vertical component of force contributed by seat belt tension; and subtracting the vertical component of force from the total downward force to determine a weight, and hence the actual mass, of the seat occupant.

5. A method for measuring the actual mass of a seat occupant secured to a seat of a vehicle by a seat belt, the method comprising the steps of:

measuring a total downward force on a seat contributed by a seat occupant and seat belt tension;

providing a first strain gauge mounted on a first attachment bolt used to couple the seat belt to a first anchor piece;

providing a second strain gauge mounted on a second attachment bolt used to couple the seat belt to a second anchor piece;

coupling said first strain gauge and said second strain gauge with a respective arm of a Wheatstone bridge contained within a sensor module;

coupling a seat weight sensor with one arm of said Wheatstone bridge;

deriving art output voltage proportional to the algebraic sum of the change in resistance to said first strain gauge and said second strain gauge less the amount of vertical force measured by said seat weight sensor, said change in resistance corresponding to an amount of vertical force exerted by the seat belt on said first strain gauge and said second strain gauge, said output voltage corresponding to a vertical component of force contributed by seat belt tension; and subtracting the vertical component of force from the total downward force to determine a weight, and hence the actual mass, of the seat occupant.

6. A seat weight sensing system for controlling the activation of an airbag coupled in association with a seat of a vehicle and having an airbag control module, the seat weight sensing system comprising:

a seat weight sensor associated with the seat and capable of measuring a total downward force on the seat contributed by a seat occupant and seat belt tension;

a seat belt associated with the seat;

a first member for coupling the seat belt to a first anchor piece on the vehicle adjacent to the seat, wherein said first member comprises a first swivel plate, a first mounting bolt and a first nut, wherein said first mounting bolt has a first off-center slit forming a first cantilever portion;

a first strain gauge disposed on said first mounting bolt to detect deflection of said first cantilever portion caused by tension on the seat belt;

a second member for coupling the seat belt to a second anchor piece on the vehicle adjacent to the seat, said second anchor piece located on an opposite side of the seat from said first anchor piece, wherein said second member comprises a second swivel plate, a second mounting bolt and a second nut, wherein said second mounting bolt has a second off-center slit forming a second cantilever portion;

a second strain gauge disposed on said second mounting bolt to detect deflection of said second cantilever portion caused by tension on the seat belt;

a seat belt tension sensor module coupled to said first strain gauge and said second strain gauge and operative to convert a voltage outputted by said first strain gauge and said second strain gauge to a load value corresponding to the amount of vertical force exerted by seat belt tension on said first anchor piece and said second anchor piece; and wherein a seat weight module is coupled to said seat belt tension sensor module, said seat weight sensor and the airbag control module, said seat weight module operative to subtract the load value from the total downward force on the seat contributed by a seat occupant and seat belt tension to determine a weight, and hence the actual mass, on the seat.

7. The seat weight sensing system of claim 6, wherein said first anchor piece is disposed on a floor of the vehicle.

8. The seat weight sensing system of claim 7, wherein said second anchor piece is disposed on said floor of the vehicle.

9. The seat weight sensing system of claim 7, wherein said second anchor piece is disposed on the seat of the vehicle.

10. The seat weight sensing system of claim 6, wherein said first anchor piece is disposed on the seat.

11. The seat weight sensing system of claim 10, wherein said second anchor piece is disposed on a floor of the vehicle.

12. The seat weight sensing system of claim 10, wherein said second anchor piece is disposed on the seat of the vehicle.

13. The seat weight sensing system of claim 6, wherein said first anchor piece is disposed on a B-pillar of the vehicle.

14. The seat weight sensing system of claim 13, wherein said second anchor piece is disposed on a floor of the vehicle.

15. The seat weight sensing system of claim 13, wherein said second anchor piece is disposed on the seat of the vehicle.

* * * * *